(12) United States Patent
Tamura

(10) Patent No.: US 9,361,484 B2
(45) Date of Patent: Jun. 7, 2016

(54) SECURITY PROCESSING APPARATUS AND SECURITY PROCESSING METHOD

(71) Applicant: KYOCERA Document Solutions Inc., Osaka (JP)

(72) Inventor: Yoshiaki Tamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/498,637

(22) Filed: Sep. 26, 2014

(65) Prior Publication Data

US 2015/0096062 A1 Apr. 2, 2015

(30) Foreign Application Priority Data

Sep. 30, 2013 (JP) .................................. 2013-203383

(51) Int. Cl.
G08B 29/00 (2006.01)
G06F 21/88 (2013.01)
G06F 21/60 (2013.01)

(52) U.S. Cl.
CPC .............. *G06F 21/88* (2013.01); *G06F 21/608* (2013.01); *G06F 2221/2111* (2013.01)

(58) Field of Classification Search
CPC ............ G06F 2221/2111; G06F 21/88; H04L 63/102; H04L 63/108; H04W 12/08; H04W 76/02; H04W 84/18
USPC .......................................................... 726/35
See application file for complete search history.

(56) References Cited

U.S. PATENT DOCUMENTS

2011/0285499 A1* 11/2011 Nakamachi ........ G05B 19/4188
340/3.32
2013/0163946 A1* 6/2013 Fukumoto .............. G11B 19/08
386/224

FOREIGN PATENT DOCUMENTS

| JP | 2001-320776 A | 11/2001 |
| JP | 2002-236619 A | 8/2002 |
| JP | 2002-325280 A | 11/2002 |

* cited by examiner

*Primary Examiner* — Kambiz Zand
*Assistant Examiner* — Abiy Getachew
(74) *Attorney, Agent, or Firm* — Stein IP, LLC

(57) ABSTRACT

The position information acquisition unit acquires the first current position information of the multifunction peripheral and the second current position information of HDD. The position information determination unit executes the first determination whether or not the first current position information is identical with the first registered position information and the second determination whether or not the second current position information is identical with the second registered position information. The activation permission unit activates the multifunction peripheral and HDD when the current position information are identical with the registered position information based on the first and second determinations, or activates the multifunction peripheral only when the current position information is identical with the registered position information based on the first or second determination, or not activates the multifunction peripheral and HDD when the current position information are not identical with the registered position information based on the first and second determinations.

10 Claims, 8 Drawing Sheets

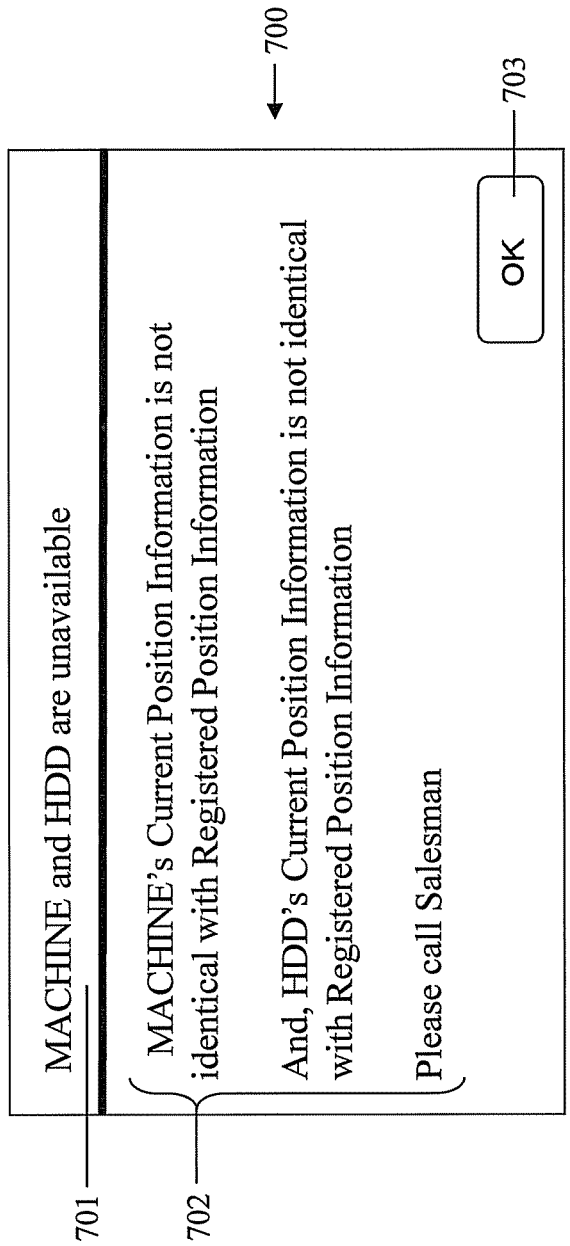

US 9,361,484 B2

SECURITY PROCESSING APPARATUS AND SECURITY PROCESSING METHOD

CROSS-REFERENCE TO RELATED APPLICATIONS

This application claims priority to Japanese Patent Application No. 2013-203383, filed on Sep. 30, 2013, the entire contents of which are incorporated by reference herein.

BACKGROUND OF THE INVENTION

Field of the Invention

This disclosure relates to security processing apparatus and security processing method.

In recent years, information (data) stored in the electronic device and the memory device becomes more valuable, and the risk of leakage of information stored therein increases due to the theft or robbery of such information device.

Generally, an encryption of the stored information is employed as a means for security enhancement. For example, when specific information is stored in a hard disk drive (HDD) of hardware, the information is encrypted and stored.

The standardization of such information protection has been accelerated by TCG (Trusted Computing Group), an industrial association that decides on the standard technology for improving the reliability and security of the computers. For example, a command interface for HDD is decided for encrypting and managing the information.

In the above-mentioned general encryption, it is difficult to decode the stored information by means of HDD itself. However, there is trouble that it is easy to restore the information in HDD if there is a machine body (host) that stores the information in HDD.

When a third person has stolen HDD only, it is not possible for him to decode the coded information, and there is few possibility that a data security problem may arise. On the other hand, when a machine body connected with HDD or a unit capable to drive HDD is stolen with HDD, the coded information in HDD can be decoded so that the information in HDD cannot be protected.

In order to settle the above-mentioned problems, there is a conventional art wherein position information is registered in HDD in advance, and HDD is not activated when HDD moves to a position not identical with the registered position information. Thereby, the security problem due to the robbery of HDD is settled. There is the other conventional art wherein the information stored in HDD is saved when the robbery of HDD is detected.

In the conventional arts, there is a problem that, when the machine body including HDD is moved from a present position to the other position, the robbery is detected erroneously and HDD cannot be used.

SUMMARY OF THE INVENTION

In accordance with an aspect of the present disclosure, a security processing apparatus includes a position information acquisition unit, a position information determination unit, and an activation permission unit. The position information acquisition unit acquires a first current position information indicating a current position of the apparatus and a second current position information indicating a current position of hard disk drive when the apparatus is activated. The position information determination unit executes a first determination whether or not the first current position information thus acquired is identical with a first registered position information indicating the position of the apparatus registered in advance, and a second determination whether or not the second current position information thus acquired is identical with a second registered position information indicating the position of the hard disk drive registered in advance. The activation permission unit activates the apparatus and the hard disk drive when the current position information are identical with the registered position information based on the first and second determinations, or activates the apparatus only when the current position information is identical with the registered position information based on the first or second determination, or not activates the apparatus and the hard disk drive when the current position information are not identical with the registered position information based on the first and second determinations.

In accordance with another aspect of the present disclosure, a security processing method including a position information acquisition step, a position information determination step, and an activation permission step. The position information acquisition step acquires a first current position information indicating a current position of a security processing apparatus and a second current position information indicating a current position of hard disk drive when the security processing apparatus is activated. The position information determination step executes a first determination whether or not the first current position information thus acquired is identical with a first registered position information indicating the position of the security processing apparatus registered in advance, and a second determination whether or not the second current position information thus acquired is identical with a second registered position information indicating the position of the hard disk drive registered in advance. The activation permission step activates the security processing apparatus and the hard disk drive when the current position information are identical with the registered position information based on the first and second determinations, or activates the security processing apparatus only when the current position information is identical with the registered position information based on the first or second determination, or does not activates the security processing apparatus and the hard disk drive when the current position information are not identical with the registered position information based on the first and second determinations.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7A shows an error message screen displayed on the touch panel of the multifunction peripheral in accordance with an embodiment of the present disclosure.

DETAILED DESCRIPTION OF THE EMBODIMENTS

The preferred embodiments of the security processing apparatus in the present disclosure will be explained below according to the attached drawings; thereby the disclosure will be clearly understood. The embodiments are examples materializing the present disclosure, and do not limit the technical scope of the present disclosure. An alphabet S prefixed to numerals in the flowchart means a "step".

<Security processing apparatus>

Figure 1:
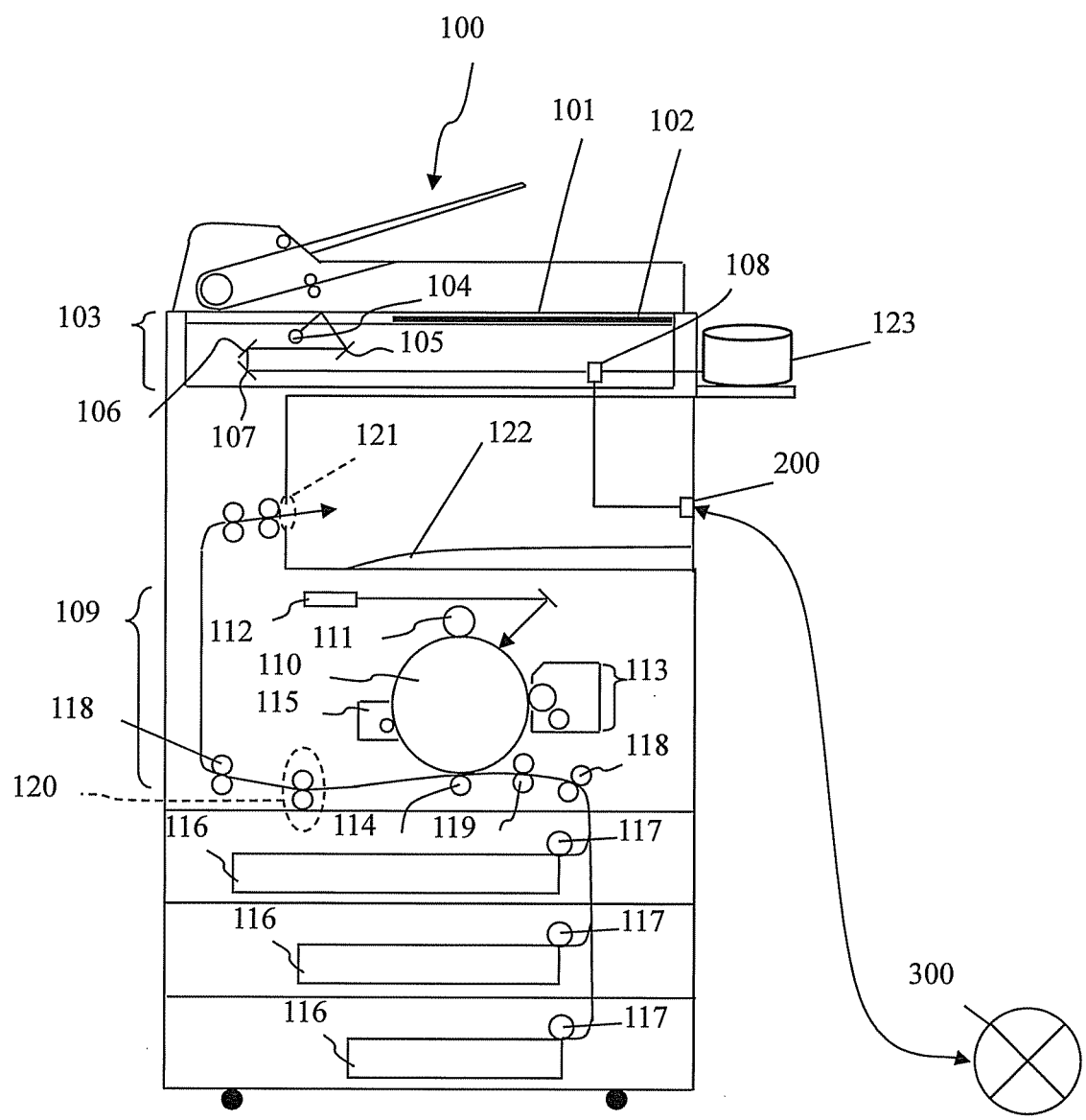
FIG. 1 is a schematic view showing an entire inside structure of a multifunction peripheral in accordance with an embodiment of the present disclosure.

The security processing apparatus related to the embodiments of the present disclosure is explained below as an image forming apparatus including HDD. FIG. 1 is a schematic view of the image forming apparatus related to the embodiment of the present disclosure, but regarding respective units not directly related to the present disclosure, the detailed explanation is omitted here.

The image forming apparatus in the present disclosure corresponds to a multifunction peripheral including a copying machine, a scanner, and a printer, for example, and functions as the image forming apparatus including the copying function, the facsimile sending and receiving function, and the printing function.

When user uses the copying function of the multifunction peripheral (MFP) 100, the working is explained briefly hereinafter with reference to FIG. 1.

When using the multifunction peripheral 100, the user puts an original on an original plate 101 provided to a top of housing. Next, the user inputs setting conditions with respect to the original from an initial screen (an operation screen) of an operation unit 102 (operation panel) by means of the operation unit 102 nearby the original plate 101. When the user selects the copying function corresponding to the image forming and presses down a start key provided to the operation unit 102, the multifunction peripheral 100 starts the selected function.

In an image reading unit 103, the light irradiated from a light source 104 is reflected on the original placed on the original plate 101. The reflected light is guided to an image element 108 by mirrors 105, 106 and 107. The guided light is converted to electric signals by the image element 108 and image data corresponding to the original is formed.

Here, it is an image forming unit 109 that forms a toner image according to the image data. The image forming unit 109 is provided with a photosensitive drum 110. The photosensitive drum 110 rotates in a specific direction at a constant speed, and a charging unit 111, an exposing unit 112, a developing unit 113, a transfer unit 114 and a cleaning unit 115 are disposed around the photosensitive drum 141 in order from an upstream side.

The charging unit 111 uniformly electrifies a surface of the photosensitive drum 110. The exposing unit 112 irradiates laser on the surface of the photosensitive drum 110 according to the image data, and forms an electrostatic latent image. The developing unit 113 forms a toner image by attaching the toner to the formed electrostatic latent image. The formed toner image is transferred to a recording media (a sheet, a paper, for example) by the transfer unit 114. The cleaning unit 115 removes the excess toner remaining on the surface of the photosensitive drum 110. A series of processing is executed by a rotation of the photosensitive drum 110.

The sheet is conveyed from one of sheet feeding cassettes 116 provided to the multifunction peripheral 100. When the sheet is conveyed, the sheet is drawn from one of sheet feeding cassettes 116 to a conveyance path by a pickup roller 117. Each sheet feeding cassette contains a different kind sheet respectively, and the sheet is conveyed according to the setting conditions for the image forming.

The sheet drawn to the conveyance path is sent between the photosensitive drum 110 and transfer unit 114 by a conveyance roller 118 and a resist roller 119. The transfer unit 114 transfers the toner image on the sent sheet, and the sheet is conveyed to the fixing unit 120.

When the sheet on which the toner image is transferred passes between the heat roller and a pressure roller provided to the fixing unit 120, the heat and pressure is applied on the toner image and a visible image is fixed on the sheet. The quantity of heat of the heat roller is set adequately according to the kind of sheet, and the fixing is performed appropriately. The image forming is completed by fixing the visible image on the sheet, and the sheet is ejected to a built-in tray 122 in the housing through an ejection port 121 by the conveyance roller 118. The sheet is stacked on and accommodated in the built-in tray 122. By the above procedure, the housing of the multifunction peripheral can provide the user with the copying function.

The multifunction peripheral 100 includes HDD (Hard Disk Drive) for storing a plurality of image data, and it is configured to supply the image data for the image forming to the image forming unit 109.

The multifunction peripheral 100 includes a communication unit 200, and the communication unit 200 can communicate with other devices through network 300.

Figure 2:
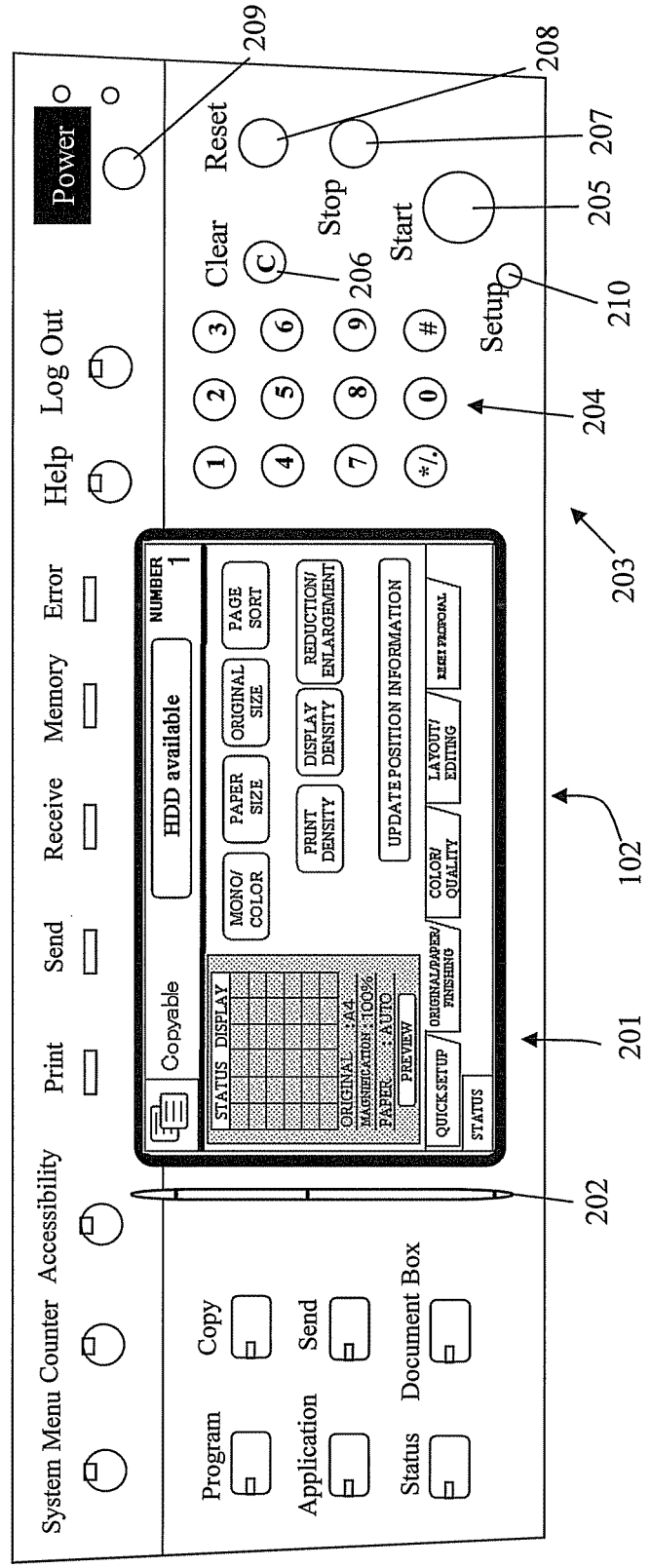
FIG. 2 is a schematic view showing an entire structure of operation unit in accordance with an embodiment of the present disclosure.

From the operation unit 102 shown in FIG. 2, the user inputs the setting conditions for the image forming and confirms the setting conditions. When inputting the setting conditions, the user uses a touch panel (operation panel) 201, a touch pen 202, or an operation key 203 that are provided to the operation unit 102.

The touch panel 201 has both a function for inputting the setting conditions and a function for displaying the setting conditions. When the user presses a key in the screen displayed on the touch panel 201, the setting condition corresponds to the pressed key is inputted.

A back of the touch panel is provided with a display unit (not shown), such as LCD (Liquid Crystal Display), and the display unit displays the operation screen such as the initial screen. The touch pen 202 is provided nearby the touch panel 201, and when the user touches the touch panel 201 with a tip of the touch pen 202, the touch panel 201 detects a point touched by the touch pen 202.

In addition, there is a predetermined number of operation keys 203 nearby the touch panel 201, such as a numeric key 208, a start key 205, a clear key 206, a stop key 207, a reset key 208, and a power key 209, for example.

Figure 3:
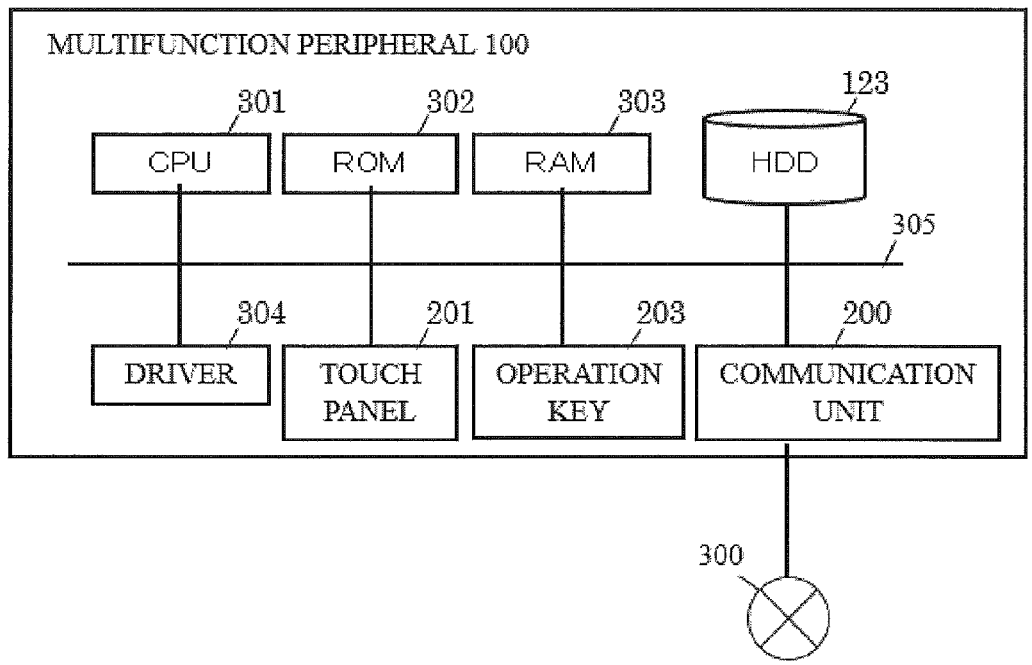
FIG. 3 is a block diagram of a control system hardware of the multifunction peripheral in accordance with an embodiment of the present disclosure.

The structure of control system hardware of the multifunction peripheral 100 will be explained below according to FIG. 3, but the details about the units that have nothing to do with the present disclosure are omitted.

A control circuit of the multifunction peripheral 100 connects CPU (Central Processing Unit) 301, ROM (Read Only Memory) 302, RAM (Random Access Memory) 303, HDD (Hard Disk Drive) 123, a driver 304 corresponding to each driving unit, a touch panel 201, an operation key 203, and a communication unit 200 through internal path 305.

CPU 301 uses RAM303 as a working area, and executes programs stored in HDD ROM 302 and HDD 123. Upon receipt of the execution result, CPU 301 receives data and instructions from the driver 304, the touch panel 201 and the communication unit 200, and a signal and command corresponding to the operation key 203, and then controls each driving unit shown in FIG. 1.

The communication unit 200 is connected with the other devices so as to communicate with them through LAN (Local Area Network) or Internet.

Excluding the above-mentioned driver, the other units described later (shown in FIG. 4) are materialized by executing the program by CPU 301. ROM 302 and HDD 123 stores the programs and data for materializing the units described later.

<Embodiment of the present disclosure>

Figure 4:
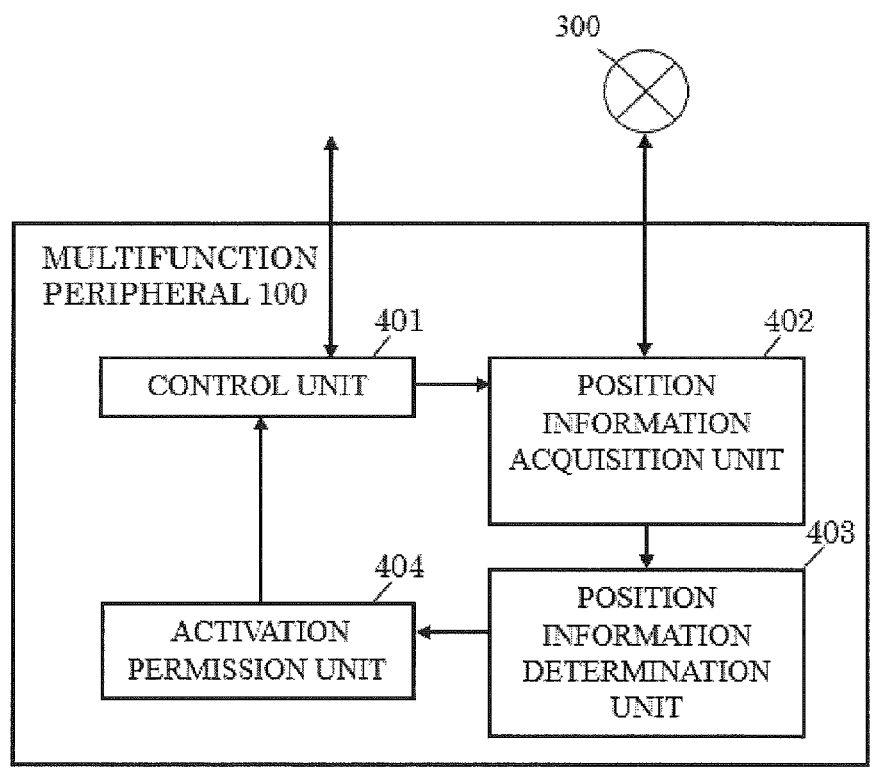
FIG. 4 is a functional block diagram of the multifunction peripheral in accordance with an embodiment of the present disclosure.
Figure 5:
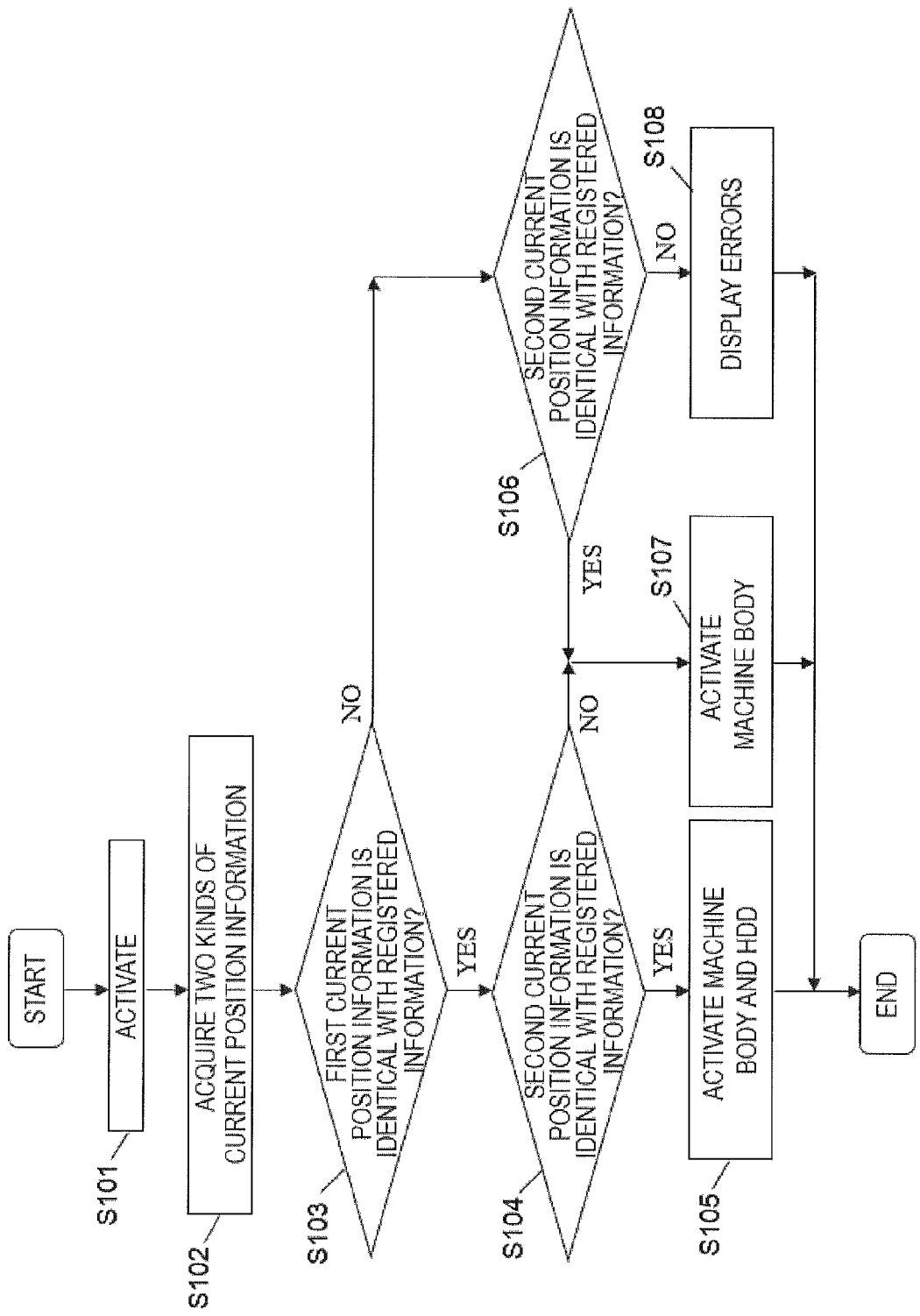
FIG. 5 is a flowchart showing execution steps in accordance with an embodiment of the present disclosure.

In accordance with FIG. 4 and FIG. 5, a structure and execution steps related to the embodiment of the present disclosure are explained.

When the user turns on the power of the multifunction peripheral 100, a control unit 401 of the multifunction peripheral 100 is activated (FIG. 5: S101) and the activation is notified to a position information acquisition unit 402. Upon receipt of the notice, the position information acquisition unit 402 acquires a first current position information indicating a current position of the multifunction peripheral 100 and a second current information indicating a current position of HDD 123 (FIG. 5: S102).

Here, as far as the first current position information and the second current position information are different in the kind each other, they are not limited in particular. For instance, there are the position information according to GPS (Global Positioning System), the position information according to PLC (Power Line Communication), the position information of MAC address of the network hub (Media Access Control address), and the position information of Wireless LAN AP (Wireless LAN Access Point). In this embodiment, the first current position information of the multifunction peripheral 100 is the position information according to GPS, and the second current position information of HDD 123 is the position information of MAC address of the network hub.

A method that the position information acquisition unit 402 acquires the first current position information and the second current information is decided according to the kind of current position information. When the first current position information is the position information according to GPS, the position information acquisition unit 402 acquires the position information of the multifunction peripheral 100 as the first current position information by using the GPS function implemented in advance in the multifunction peripheral 100. When the second current position information of HDD 123 is the position information of MAC address of the network hub, the position information acquisition unit 402 accesses the communication unit 200 of the multifunction peripheral 100 connected with HDD 123, and acquires the current position information of HDD as the second current position information.

After completing the acquisition of the first current position information and the second current position information, the position information acquisition unit 402 notifies the position information determination unit 403 of the completion. Upon receipt of the notice, the position information determination unit 403 executes a first determination if the first current position information thus acquired is identical with a first registered position information indicating the position information of the multifunction peripheral 100 registered in advance. Additionally, the position information determination unit 403 executes a second determination if the second current position information thus acquired is identical with a second registered position information indicating the position information of HDD 123 registered in advance (FIG. 5: S103, S104).

The determination method executed by the position information determination unit 403 is not limited in particular. It is executed as follows, for example.

The determination regarding the position information of the multifunction peripheral 100 is executed first, namely, the position information determination unit 403 acquires the first registered position information of the multifunction peripheral 100 stored in a first memory, and determines whether or not the first current position information thus acquired is identical with the first registered position information (FIG. 5: S103).

As a result of the determination in S103, when the first current position information is identical with the first registered position information (FIG. 5: S103 YES), the determination regarding the position information of HDD 123 is executed, namely, the position information determination unit 403 acquires the second registered position information of HDD123 stored in a second memory, and determines whether or not the second current position information thus acquired is identical with the second registered position information (FIG. 5: S104).

As a result of the determination in S104, when the second current position information is identical with the second registered position information (FIG. 5: S104 YES), the position information determination unit 403 determines that the two kinds of current position information are proper because the current position information are identical with the registered position information in the first and second determinations. And then the position information determination unit 403 notifies an activation permission unit 404 of the result. Upon receipt of the notice, the activation permission unit 404 permits the activation of the multifunction peripheral 100 and HDD 123, and activates the multifunction peripheral 100 and HDD 123 normally through the control unit 401 (FIG. 5: S105).

The control unit 401 starts power supply to each unit of the multifunction peripheral 100 to bring the multifunction peripheral 100 to a state capable to provide with the functions, and allows multifunction peripheral 100 to communicate with HDD 123. And then the control unit 401 displays an operation screen 600 on the touch panel 201.

Figure 6A:
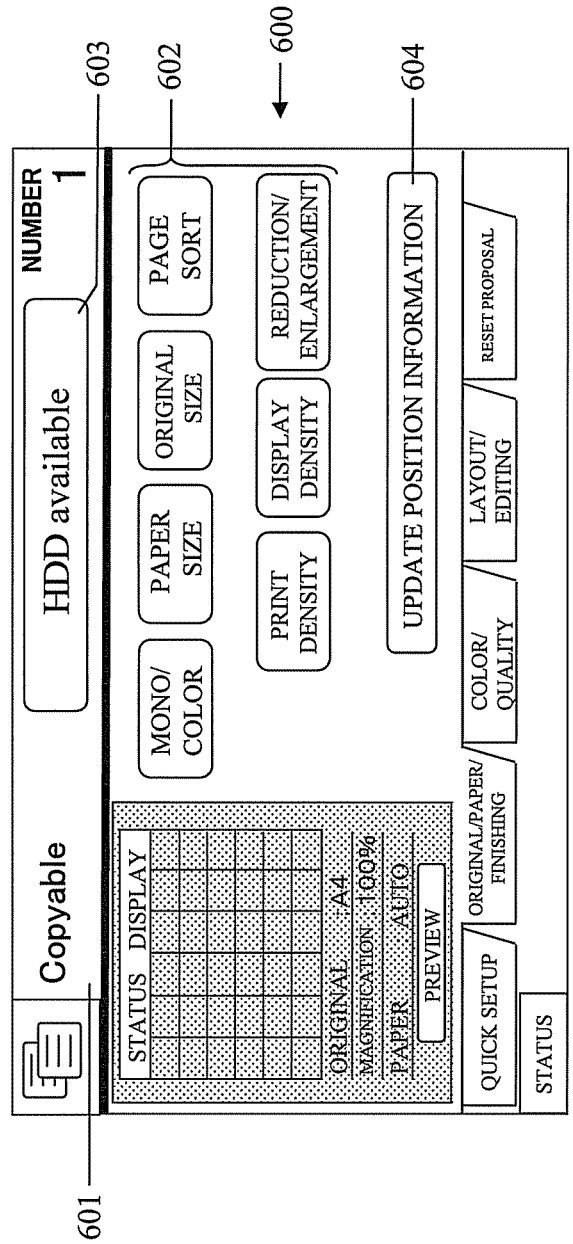
FIG. 6A and FIG. 6B show examples of operation screen displayed on a touch panel of the multifunction peripheral in accordance with an embodiment of the present disclosure.

As shown in FIG. 6A, the operation screen 600 displays predetermined messages; "copyable" 601, function item keys 602, and "HDD available" 603 indicating that HDD123 is available. The function item keys 602 are for inputting the setting conditions for the copying function, and so on. Thereby the user can confirm that the multifunction peripheral 100 and HDD 123 are activated normally and those are available. The operation screen 600 displays a position information update key 604 to be pressed down for updating the first registered position information and the second registered position information. The usage of the position information update key 604 will be described later.

As a result of the determination in S103, when the first current position information is not identical with the first registered position information (FIG. 5, S103 NO), the position information determination unit 403 determines that the current position information of the multifunction peripheral 100 is not proper based on the first determination. Next, the determination of the position information of HDD 123 is executed, namely, the position information determination unit 403 determines whether or not the second current position information is identical with the second registered position information (FIG. 5: S106).

As a result of the determination in S106, when the second current position information is identical with the second registered position information (FIG. 5: S106 YES), the position information determination unit 403 determines that only one kind of current position information is proper of the two kinds of current position information thus acquired because the current position information is identical with the registered position information in the second determination. The position information determination unit 403 notifies the activation permission unit 404 of the result. Upon receipt of the notice, the activation permission unit 404 permits the activation of the multifunction peripheral 100 only and not permits the activation of HDD 123, and activates the multifunction peripheral 100 normally through the control unit 401 (FIG. 5, S107).

In this case, the control unit 401 starts power supply to each unit of the multifunction peripheral 100 to bring the multifunction peripheral to a state capable to provide with the functions, and does not allow the multifunction peripheral 100 to communicate with HDD 123. And then the control unit 401 displays an operation screen 605 on the touch panel 201.

Figure 6B:
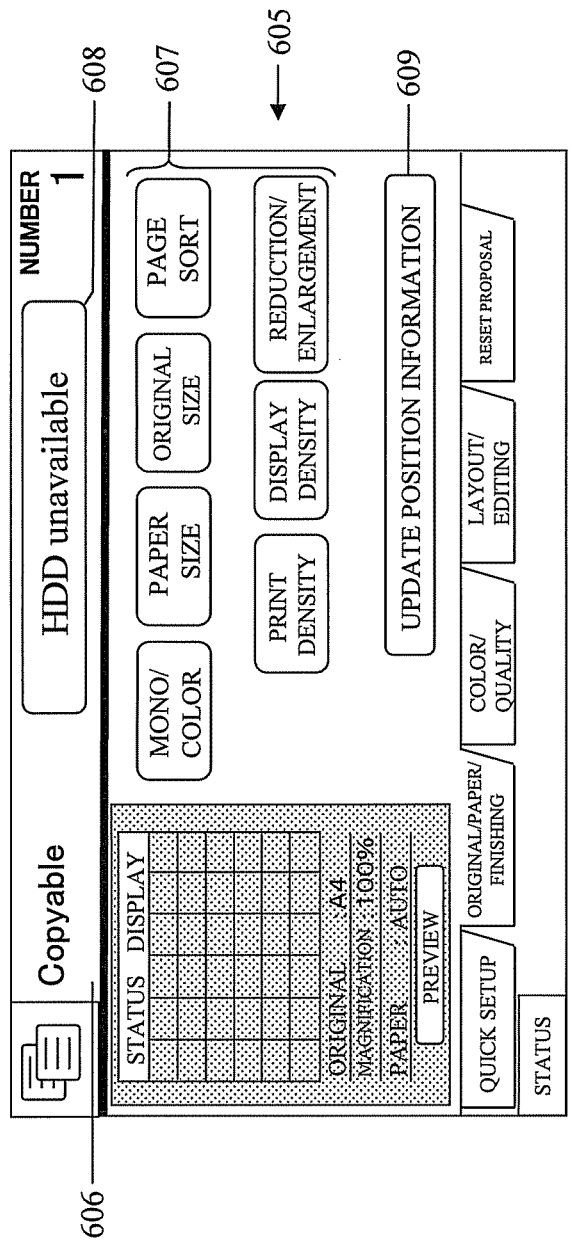

As shown in FIG. 6B, the operation screen 605 displays predetermined messages; "copyable" 606, function item keys 607, and "HDD unavailable" 608 indicating that HDD 123 is not available. The operation screen 605 displays the position information update key 604 to be pressed down, in the same manner as above. Thereby, the user can confirm that only the multifunction peripheral 100 is available and HDD 123 is not available.

In this case, it is not possible to access HDD 123, but only the multifunction peripheral 100 can be activated. Therefore, if the user has registered (set) the first registered position information and the second registered position information by mistake or a new location address has changed, it is possible to update the registered position information properly by means of the activated multifunction peripheral 100 as described later, whereby the multifunction peripheral 100 and HDD 123 can be activated normally. The above-mentioned mistake regarding the registered position information corresponds to a case where the information regarding the position information according to GPS match each other but the information regarding the position information of MAC address do not match, which is caused by a setting place in a building.

As a result of the determination in S104, when the second current position information is not identical with the second registered position information (FIG. 5, S104 NO), the position information determination unit 403 determines that only one kind of current position information is proper of the two kinds of current position information thus acquired because the current position information is not identical with the registered position information in the first determination. The activation permission unit 404 permits only the activation of the multifunction peripheral 100 and not permit the activation of HDD 123 (FIG. 5, S107).

As a result of the determination in S106, when the second current position information is not identical with the second registered position information (FIG. 5, S106 NO), the position information determination unit 403 determines that the two kinds of current position information are not proper of the two kinds of current position information thus acquired because the current position information are not identical with the registered position information in the first and second determination. The position information determination unit 403 notifies the activation permission unit 404 of the result. Upon receipt of the notice, the activation permission unit 404 does not permit the activation of the multifunction peripheral 100 and the activation of HDD 123, and displays an error message screen 700 through the control unit 401 (FIG. 5, S108).

In this case, the control unit 401 starts power supply to only the operation unit 102 among the units of the multifunction peripheral 100, and does not allow the multifunction peripheral 100 to communicate with HDD 123. And then the control unit 401 displays the error message screen 700 on the touch panel 201.

As shown in FIG. 7A, the error message screen 700 displays a predetermined message "Machine and HDD unavailable" 701, a message explain the reason "Machine's current position information is not identical with the registered information, and HDD's current position information is not identical with the registered information. Please call the serviceman" 702, and an OK key 703. Thereby, the user can confirm that the multifunction peripheral 100 and HDD 123 are not available.

In the above case, if the third person steals and activates the multifunction peripheral 100 and HDD 123 at a place different from the original installation location of them without changing the first registered position information of the multifunction peripheral 100 and the second registered position information of HDD 123, both the multifunction periphery 100 and HDD 123 cannot be activated. Accordingly, if the coded image data is stored in HDD 123 and a driver for decoding the coded image data is implemented in the multifunction peripheral 100, since both the multifunction peripheral 100 and HDD 123 are not activated, it is impossible to decode the coded data in HDD 123. Therefore, when the robbery occurs, it is possible to prevent the data leakage of HDD 123 certainly, and improve the data security of HDD 123.

In order to improve the data security of HDD 123 moreover, it is configured that, after the activation permission unit 404 deletes all the data stored in HDD 123, the control unit 401 may display the error message screen 700 or send an alarm and notification.

When the multifunction peripheral 100 and HDD 123 are to move from a current position to the other position due to the transfer of office or the moving of company, the user updates the first registered position information and the second registered position information by means of the position information update key 604.

The updating of the first registered position information and the second registered position information may be executed in any method. For instance, it is assumed that at least the multifunction peripheral 100 is activated normally, as shown in S105 or S107, and the control unit 401 displays a position information update screen 704 on the touch panel 201 when the user presses down the position information update key 604 while watching the operation screen 600.

Figure 7B:
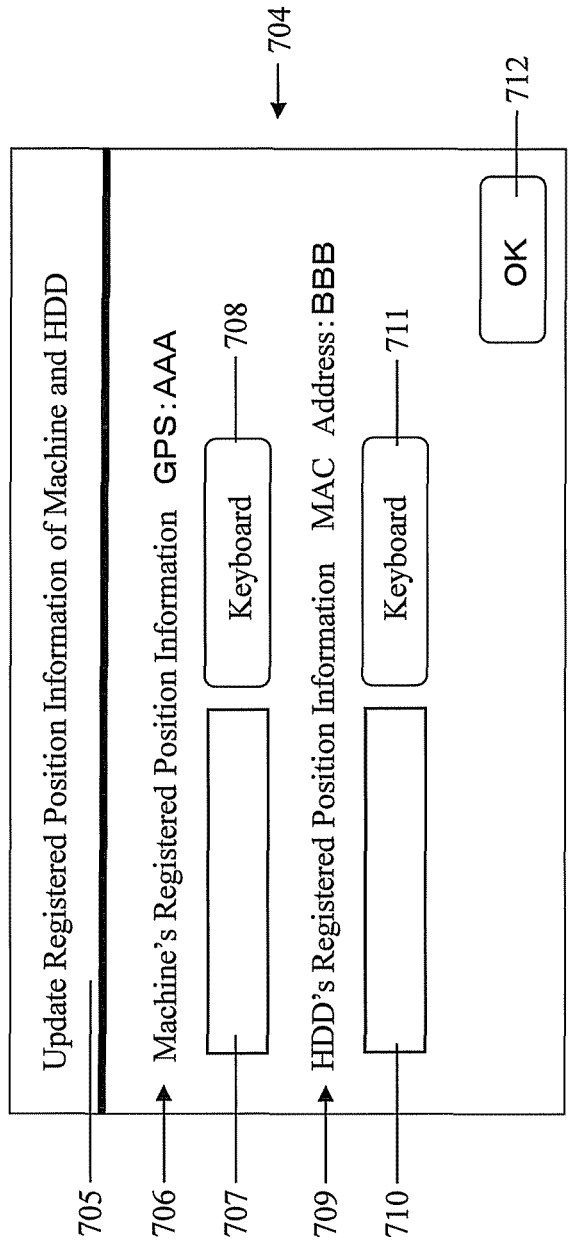
FIG. 7B shows a position information update screen displayed on the touch panel of the multifunction peripheral in accordance with an embodiment of the present disclosure.

As shown in FIG. 7B, the position information update screen 704 displays predetermined messages: "Update Registered information of Machine and HDD" 705; "Machine's registered position information: GPS AAA" 706 that corresponds to the registered information of the machine; an input box 707 for inputting the position information to be updated; a keyboard key 708; "HDD's registered position information: MAC Address BBB" 709 that corresponds to the registered information of HDD 123; an input box 710 for inputting the position information to be updated; a keyboard key 711; and the OK key 712. By means of those keys, the user updates (changes) the registered position information to the relocation position information of the multifunction peripheral 100 and HDD 123, before the moving.

Here, while the user is watching the position information update screen 704, he inputs "CCC" as the first registered position information in the input box 707 and "DDD" as the second registered position information in the input box 710, and then presses down the OK key 712, the control unit 410 accepts the first registered position information "CCC" and the second registered position information "DDD" inputted newly. The control unit 401 updates from the old first registered position information "AAA" stored in the first memory to the new first registered position information "CCC", and also updates from the old second registered position information "BBB" stored in the second memory to the new first registered position information "DDD".

According to the above method, in case of moving the multifunction peripheral 100 and HDD 123 to a specific location, the first registered position information and the second registered position information can be changed to the proper registered position information in advance.

After completing the update of the registered position information, the control unit 401 stops the multifunction peripheral 100 and HDD 123 if HDD is activated. After that, when the user moves the multifunction peripheral 100 and HDD 123 to the location corresponding to the updated registered position information and activates the multifunction peripheral 100, the steps turns back to S101, the comparison of the first current position information and the first registered position information and the comparison of the second current position information and the second registered position information are executed.

Besides, assuming in the above embodiment that at least the multifunction peripheral 100 is activated, it is configured that a general user can updates the first registered position information and the second registered position information, but other modification may be considered. For instance, it may be configured that a specific user like an administrator having a specific right is allowed to update the first registered position information and the second registered position information. Hereby, only the specific user can activate the multifunction peripheral 100 and HDD 123 normally when the multifunction peripheral 100 and HDD 123 has moved, and the data security of HDD 123 can be improved further more.

The method for identify the specific user is not limited in particular. For instance, the control unit 401 receives identification information inputted by the user and determines whether or not the input identification information is identical with specific identification information indicating the specific user registered in advance. Upon receipt of the determination result, when the input identification information is identical with the specific identification information, the control unit 401 determines that the user is the specific user, permits the pressing down of the registered position information update key 604 and allows the user to update the first registered position information and the second registered position information. When the input identification information is not identical with the specific identification information based on the determination result, the control unit 401 determines that the user is not the specific user, does not permit the pressing down of the registered position information update key 604, and does not allow the user to update the first registered position information and the second registered position information.

According to the present disclosure, it is possible to ensure the user-friendliness and improve the data security of data in the hard disk drive.

In the embodiment of the present disclosure, the multifunction peripheral 100 is assumed to be the security processing apparatus, however, if the apparatus is connecting with HDD storing the data, it can be used to the security processing apparatus. For instance, the image reading apparatus like the scanner, the image forming apparatus like the copying machine and the printer, or the data processing apparatus like PC may be applied.

In the embodiment of the present disclosure, the multifunction peripheral 100 is configured to include each unit, however, it may be configured to store the program materializing each unit in a recording media and provide with the recording media. In such configuration, after reading out the program to the multifunction peripheral 100, the multifunction peripheral 100 materializes each unit. In this case, the program read out from the recording media can provide with the effect of the resent disclosure. In addition, it is possible to provide with the method for storing the steps executed by each unit in the hard disk.

What is claimed is:

1. A security processing apparatus comprising:
    a first memory storing a first registered position information indicating a position of the security processing apparatus in advance;
    a second memory storing a second registered position information indicating a position of a hard disk drive in advance;
    a position information acquisition unit for acquiring a first current position information indicating a current position of the apparatus and a second current position information indicating a current position of the hard disk drive when the apparatus is activated;
    a position information determination unit for executing a first determination whether or not the first current position information thus acquired is identical with the first registered position information, and a second determination whether or not the second current position information thus acquired is identical with the second registered position information; and
    an activation permission unit for activating the apparatus and the hard disk drive when the current position information are identical with the registered position information based on the first and second determinations, or activating the apparatus only when the current position information is identical with the registered position information based on the first or second determination, or not activating the apparatus and the hard disk drive when the current position information are not identical with the registered position information based on the first and second determinations,
    wherein the first registered position information and the second registered position information are different in kind, one is the position information based on a global positioning system and the other is the position information based on a communication network system.

2. The security processing apparatus according to claim 1, wherein the first current position information and the second current position information are two kinds of different information indicating the current position.

3. The security processing apparatus according to claim 1, further comprising:
    a control unit for starting power supply to each unit of the apparatus and the hard disk drive, and allowing the apparatus to communicate with the hard disk drive, when the activation permission unit activates the apparatus.

4. The security processing apparatus according to claim 1, further comprising:
a control unit for starting power supply to each unit of the apparatus, and not allowing the apparatus to communicate with the hard disk drive, when the activation permission unit activates the apparatus only.

5. The security processing apparatus according to claim 1, further comprising: a control unit for displaying an error message screen on a touch panel of an operation unit, when the activation permission unit does not activate the apparatus and the hard disk drive.

6. The security processing apparatus according to claim 1, wherein
the activation permission unit deletes all data stored in the hard disk drive when the apparatus and the hard disk drive are not activated.

7. The security processing apparatus according to claim 1, wherein
the activation permission unit deletes all data stored in the hard disk drive and sends an alarm when the apparatus and the hard disk drive are not activated.

8. The security processing apparatus according to claim 1, further comprising:
a control unit for allowing only a specific user having a specific right to update the first registration position information and the second registered position information.

9. An image forming apparatus corresponding to the security processing apparatus according to claim 1.

10. A security processing method comprising:
a storing step for storing a first registered position information indicating a position of a security processing apparatus in a first memory in advance (Para.[0048]), and storing a second registered position information indicating a position of a hard disk drive in a second memory in advance;
a position information acquisition step for acquiring a first current position information indicating a current position of the security processing apparatus and a second current position information indicating a current position of the hard disk drive when the security processing apparatus is activated;
a position information determination step for executing a first determination whether or not the first current position information thus acquired is identical with a first registered position information, and a second determination whether or not the second current position information thus acquired is identical with a second registered position information; and
an activation permission step for activating the security processing apparatus and the hard disk drive when the current position information are identical with the registered position information based on the first and second determinations, or activating the security processing apparatus only when the current position information is identical with the registered position information based on the first or second determination, or not activating the security processing apparatus and the hard disk drive when the current position information are not identical with the registered position information based on the first and second determinations,
wherein the first registered position information and the second registered position information are different in kind, one is the position information based on a global positioning system and the other is the position information based on a communication network system.

* * * * *